UNITED STATES PATENT OFFICE.

SAMPSON AMERICAN, OF CHICAGO, ILLINOIS.

COMPOSITION FOR TOILETS.

Specification forming part of Letters Patent No. 29,944, dated September 11, 1860.

*To all whom it may concern:*

Be it known that I, SAMPSON AMERICAN, of the city of Chicago, in the county of Cook and State of Illinois, have invented a new and useful Compound for Toilet Use; and I do declare that the following is a full and exact description thereof.

The nature of my invention consists in making a compound for toilet use by a combination of the following ingredients: oil of turpentine, alkanet-root, alum, oil of roses, and oil of neroli.

To enable others skilled in the art to make and use my invention, I will proceed to describe the manner in which I prepare my compound for use. I take—

Oil of turpentine, four ounces; alkanet-root, one-half ounce; alum, two drams; oil of roses, twelve drops; oil of neroli, six drops, and mix them as follows: The oil of turpentine, alkanet-root and alum, in the proportions above stated, are put into a bottle, which is closed and placed in a vessel containing warm water, the heat of which is then gradually increased to about 110° Fahrenheit, and is kept at this temperature for about two hours, or until the color is extracted from the alkanet-root, when it may be removed and allowed to stand about fifteen hours. The bottle is again placed in the vessel and made to go through the same process and the same time, when it is again taken out and uncorked and the compound is exposed to the air for about twelve hours, when it is again corked and allowed to stand about ten days exposed to the sun. This decoction is then filtered, and I then add the oil of roses and the oil of neroli in the proportions above mentioned. This compound, when applied to the flesh, gives it a beautiful color, similar to that of persons of the fairest complexion when in perfect health. This compound may be applied by any ordinary method by rubbing it over the surface to be colored. The color may be made brighter according to the number of applications. After the application is made the parts may be washed with milk or cold water, and when the color is desired to be removed alcohol is the agent used. This compound will not injure the skin in the slightest degree, and when applied the skin appears to rival nature herself in beauty.

What I claim as my invention, and desire to secure by Letters Patent, is—

A compound formed by the admixture of the oil of turpentine, alkanet-root, alum, th oil of roses, and the oil of neroli, substantially in the manner and for the purposes herein specified.

SAMPSON AMERICAN. [L. S.]

Witnesses:
GEO. COATSWORTH,
J. CLOUGH HAINES.